United States Patent
Chung et al.

(10) Patent No.: US 6,738,767 B1
(45) Date of Patent: May 18, 2004

(54) SYSTEM AND METHOD FOR DISCOVERING SCHEMATIC STRUCTURE IN HYPERTEXT DOCUMENTS

(75) Inventors: Christina Yip Chung, Davis, CA (US); Neelakantan Sundaresan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/531,019

(22) Filed: Mar. 20, 2000

(51) Int. Cl.[7] .............................................. G06F 17/30
(52) U.S. Cl. ................. 707/7; 707/3; 707/10; 709/246
(58) Field of Search ................. 707/3, 16, 104.1, 707/7, 1, 5, 103 Y; 715/523, 503, 513; 709/246, 100, 332

(56) References Cited

U.S. PATENT DOCUMENTS

| | | | |
|---|---|---|---|
| 5,317,686 A | * 5/1994 | Salas et al. | 715/503 |
| 5,694,592 A | 12/1997 | Driscoll | 395/603 |
| 5,848,407 A | 12/1998 | Ishikawa et al. | 707/2 |
| 5,970,490 A | * 10/1999 | Morgenstern | 707/10 |
| 6,336,124 B1 | * 1/2002 | Alam et al. | 715/523 |
| 6,519,617 B1 | * 2/2003 | Wanderski et al. | 715/513 |
| 6,523,022 B1 | * 2/2003 | Hobbs | 707/3 |

OTHER PUBLICATIONS

"Identifying Aggregates in Hypertext Structures", ACM Conference on Hypertext, 3rd San Antonio, Dec. 15–18, 1991, pp. 63–74.
"Structural Properties of Hypertext", ACM Conference on Hypertext and Hypermedia, 9th, Pittsburgh, Jun. 20–24, 1998, Proceedings, pp. 180–187.
"Inferring Structure in Semistructured Data", SIGMOND Record, vol. 26, issue 4, Dec. 1997, pp. 39–43.
"Extracting Schema from Semistructured Data", SIGMOND Record, vol. 27, issue 2, Jun. 1998, pp. 295–306.

* cited by examiner

*Primary Examiner*—Charles Rones
*Assistant Examiner*—Hassan Mahmoudi
(74) *Attorney, Agent, or Firm*—Lacasse & Associates, LLC; Randy W. Lacasse; Leonard Guzman

(57) ABSTRACT

An underlying schema is discovered for an HTML document or a set of HTML documents, authored in various styles. Prior domain knowledge regarding punctuation, keywords, synonyms and HTML tags is used to 1) break a document up into separate objects, 2) identify the objects corresponding to keywords, 3) regroup objects: into hierarchical layers of abstraction, 4) logically order objects at the same level of abstraction, and 5) finally remove any non-keyword related information from the document's discovered schematic structure. The discovered schema supports structural queries from search engines that locate data that are more semantically related to the requested information than data located by simple keyword searching.

23 Claims, 13 Drawing Sheets

```
<html>
    <body>
        <h1> Resume of John Dole </h1>
        <h2> Education
            <table>
                <tr> <td> <item>
                        Ph.D. in Comp. Sci
                        University of California
                        Sept 1996-Present
                </item> </td> </tr>
                <tr> <td> <item>
                        B.S.(Computer Science)
                        Stanford University
                        Sep 1993-Jun 1996
                        GPA 3.9/4.0
                </item> </td> </tr>
            </table>
        <h2> Experience </h2>
            <ul>
                <li> <item>
                        Research Assistant
                        University of California
                        Sep 1997-Present
                </item> </li>
                <li> <item>
                        Teaching Assistant
                        University of California
                        Sep 1996-Jun 1997
                </item> </li>
            </ul>
        </h2>
    </body>
</html>
```

FIG. 4B

```
<html>
  <body>
    <h1> Resume of John Dole </h1>
    <h2> Education
    <table>
      <tr> <td> <item>
          <Degree> Ph.D. in Comp. Sci </Degree>
          <Organization> University of California </Organization>
          <Date> Sept 1996-Present </Date>
      </item> </td> </tr>
      <tr> <td> <item>
          <Degree> B.S.(Computer Science) </Degree>
          <Organization> Stanford University </Organization>
          <Date> Sep 1993-Jun 1996 </Date>
          <GPA> GPA 3.9/4.0 </GPA>
      </item> </td> </tr>
    </table>
    <h2> Experience </h2>
    <ul>
      <li> <item>
          <Title> Research Assistant </Title>
          <Organization> University of California </Organization>
          <Date> Sep 1997-Present </Date>
      </item> </li>
      <li> <item>
          <Title>Teaching Assistant </Title>
          <Organization> University of California </Organization>
          <Date> Sep 1996-Jun 1997 </Date>
      </item> </li>
    </ul>
    </h2>
  </body>
</html>
```

```
<html>
   <body>                                                            650
      <h1> Resume of John Dole
         <group>
            <h2> Education
               <table>
                  <tr> <td> <item>
                     <Degree> Ph.D. in Comp. Sci </Degree>
                     <Organization> University of California </Organization>
                     <Date> Sept 1996-Present </Date>
                  </item> </td> </tr>
                  <tr> <td> <item>
                     <Degree> B.S.(Computer Science) </Degree>
                     <Organiation> Stanford University </Organization>
                     <Date> Sep 1993-Jun 1996 </Date>
                     <GPA> GPA 3.9/4.0 </GPA>
                  </item> </td> </tr>
               </table>
               <h2> Experience
                  <group>
                     <ul>
                        <li> <item>
                           <Title> Research Assistant </Title>
                           <Organization> University of California </Organization>
                           <Date> Sep 1997-Present </Date>
                        </item> </li>
                        <li> <item>
                           <Title>Teaching Assistant </Title>
                           <Organization> University of California </Organization>
                           <Date> Sep 1996-Jun 1997</Date>
                        </item> </li>
                     </ul>
                  </group>
               </h2>
            </h2>
         </group>
      </h1>
   </body>
</html>
```

FIG. 6B

```
<html>
    <body>                                              750
        <h1> Resume of John Dole
            <group>
                <h2> Education
                    <table>
                        <tr> <td> <item>
                            <Degree> Ph.D. in Comp. Sci </Degree>
                            <Organization> University of California </Organization>
                            <Date> Sept 1996-Present </Date>
                        </item> </td> </tr>
                        <tr> <td> <item>
                            <Degree> B.S.(Computer Science)</Degree>
                            <Organization> Stanford University </Organization>
                            <Date> Sep 1993-Jun 1996</Date>
                            <GPA> GPA 3.9/4.0 </GPA>
                        </item> </td> </tr>
                    </table>
                </h2>
                <h2> Experience
                    <group>
                        <ul>
                            <li> <item>
                                <Title> Research Assistant </Title>
                                <Organization> University of California </Organization>
                                <Date> Sep 1997-Present </Date>
                            </item> </li>
                            <li> <item>
                                <Title>Teaching Assistant </Title>
                                <Organization> University of California </Organization>
                                <Date> Sep 1996-Jun 1997</Date>
                            </item> </li>
                        </ul>
                    </group>
                </h2>
            </group>
        </h1>
    </body>
</html>
```

FIG. 7B

After Consolidation

```
<html>
<Education> Education
    <Degree> Ph.D. in Comp. Sci.
        <Organization> University of California </Organization>
        <Date> Sept 1996-Present </Date>
    </Degree>
    <Degree> B.S. (Computer Science)
        <Organization> Stanford University </Organization>
        <Date> Sep 1993-Jun 1996 </Date>
        <GPA> GPA 3.9/4.0 </GPA>
    </Degree>
</Education>
<Experience> Experience
    <Title> Research Assistant
        <Organization> University of California </Organization>
        <Date> Sep 1997-Present </Date>
    </Title>
    <Title> Teaching Assistant
        <Organization> University of California </Organization>
        <Date> Sep 1996-Jun 1997</Date>
    </Title>
</Experience>
</html>
```

SYSTEM AND METHOD FOR DISCOVERING SCHEMATIC STRUCTURE IN HYPERTEXT DOCUMENTS

BACKGROUND OF THE INVENTION

1. Field of Invention

The present invention generally relates to document processing. The method and apparatus of the present invention have particular application to extracting schematic information from a set of documents.

2. Discussion of Prior Art

The world wide web (throughout this specification,web, www, and world wide web are used interchangeably) is presently growing at an average of 1 million pages per day and is an amazing source of information. All of this information is buried in HTML documents authored by a wide variety of people with differing skills, culture, and purpose and using a wide variety of tools to author these pages. HTML does give structure to the authored documents, but mainly for viewing purposes. HTML has a fixed set of tags which are mostly used to enhance the visual appeal of the documents. Thus, it often happens that HTML pages for the same purpose have a different set of tags. For instance, people often mark-up their resumes in HTML on their home pages. Depending on the styles, these resume documents look significantly different from each other. This difference is acceptable for viewing purposes, but presents great difficulties to automatic programs which try to extract pertinent information from them.

The web is not just used for browsing anymore; automatic programs, like web crawlers, visit web sites and extract information to serve search engines, or push engines. Comparison shopping engines visit web sites describing similar information, such as prices, and extract semantic information from these sites. Given the format variances possible between topically related web pages, retrieved data is often unhelpful, unrelated or difficult to extract.

However, the present invention addresses this need to build search engines that allow users to formulate structural queries like "find a student with a Master's degree and a GPA of 3.5 or more and skills in Java." The present invention allows the extraction of structural information buried in HTML pages which cater to the same topic but are authored with significantly different styles.

Some specific prior art related to the present invention is discussed below. These references describe methods of investigating the structure of documents and retrieving documents from large databases in response to user queries.

Two articles which describe attempts to discover structure from semi-structured data are "Identifying Aggregates in Hypertext Structures", Proceedings of ACM Hypertext '91, pp. 63–74, and "Structural Properties of Hypertext", Proceedings of the Ninth ACM Conference on Hypertext, pp. 180–187, 1998. These attempts, however, focus on the organization of a set of hypertext documents by following their links rather than considering the schematic nature of the individual documents.

Three other articles describing related investigations are: "Inferring Structure in Semistructured Data", Workshop on Management of Semistructured Data, 1997; "Extracting Schema from Semistructured Data", SIGMOD98, pp. 295–306; and "Discovering Association of Structure from Semistructured Objects", IEEE Trans. on Knowledge and Data Engineering, 1999. However, these articles do not consider the schematic structure of individual documents or documents which have different schemas.

The patent to Driscoll (U.S. Pat. No. 5,694,592) teaches a method of querying and retrieving documents from a database using semantic knowledge about the query string to determine document relevancy.

The patent to Ishikawa (U.S. Pat. No. 5,848,407) describes a method of presenting potentially related hypertext document summaries to a user who is using a search engine that indexes a plurality of hypertext documents.

Whatever the precise merits and features of the prior art in this field, the earlier art does not achieve or fulfill the purposes of the present invention. The prior art does not provide for automatically identifying schematic structural and tag information from HTML documents and then converting these documents according to the extracted information.

SUMMARY OF THE INVENTION

The present invention describes a system and method that extracts keywords and structural information from hypertext or mark-up language documents (e.g. HTML) and then reformulates them as documents with a common structure and common set of tags. One underlying goal is to convert a collection of HTML documents, written in different styles, into XML documents following a common schema. XML, eXtended Markup Language, defines a web standard for describing schemas for different domains. For instance, one domain might be resumes, and a schema can be defined for describing all resumes. Thus all resume documents are written using the structure and tags described by this schema. Thereafter, keyword based search engines will be able to support queries and retrieve documents that are schematically and semantically closer to the information users are looking for. Using a five-stage process, the common schematic structures are discovered for the set of HTML documents authored in various styles. Prior domain knowledge regarding punctuation, keywords, synonyms and HTML tags is used to 1) break a document up into separate objects, 2) identify the objects corresponding to keywords, 3) regroup objects into hierarchical layers of abstraction, 4) logically order objects at the same level of abstraction, and finally 5) remove any non-keyword related information from the document's discovered schematic structure. The discovered schema supports structural queries from search engines that locate data that are more semantically related to the requested information than data located by simple keyword searching.

BRIEF DESCRIPTION OF THE DRAWINGS

FIG. 4b illustrates the effect of the tokenization function of the present invention on an example XML document's coding.

FIG. 5b illustrates the effect of the keywording function of the present invention on an example XML document's coding.

FIG. 6b illustrates the effect of the phrasing function of the present invention on an example XML document's coding.

FIG. 7b illustrates the effect of the heading function of the present invention on an example XML document's coding.

FIG. 8b illustrates the coding of an extracted schema from an example XML tree resulting from applying the consolidation function of the present invention.

DESCRIPTION OF THE PREFERRED EMBODIMENTS

Figure 1:
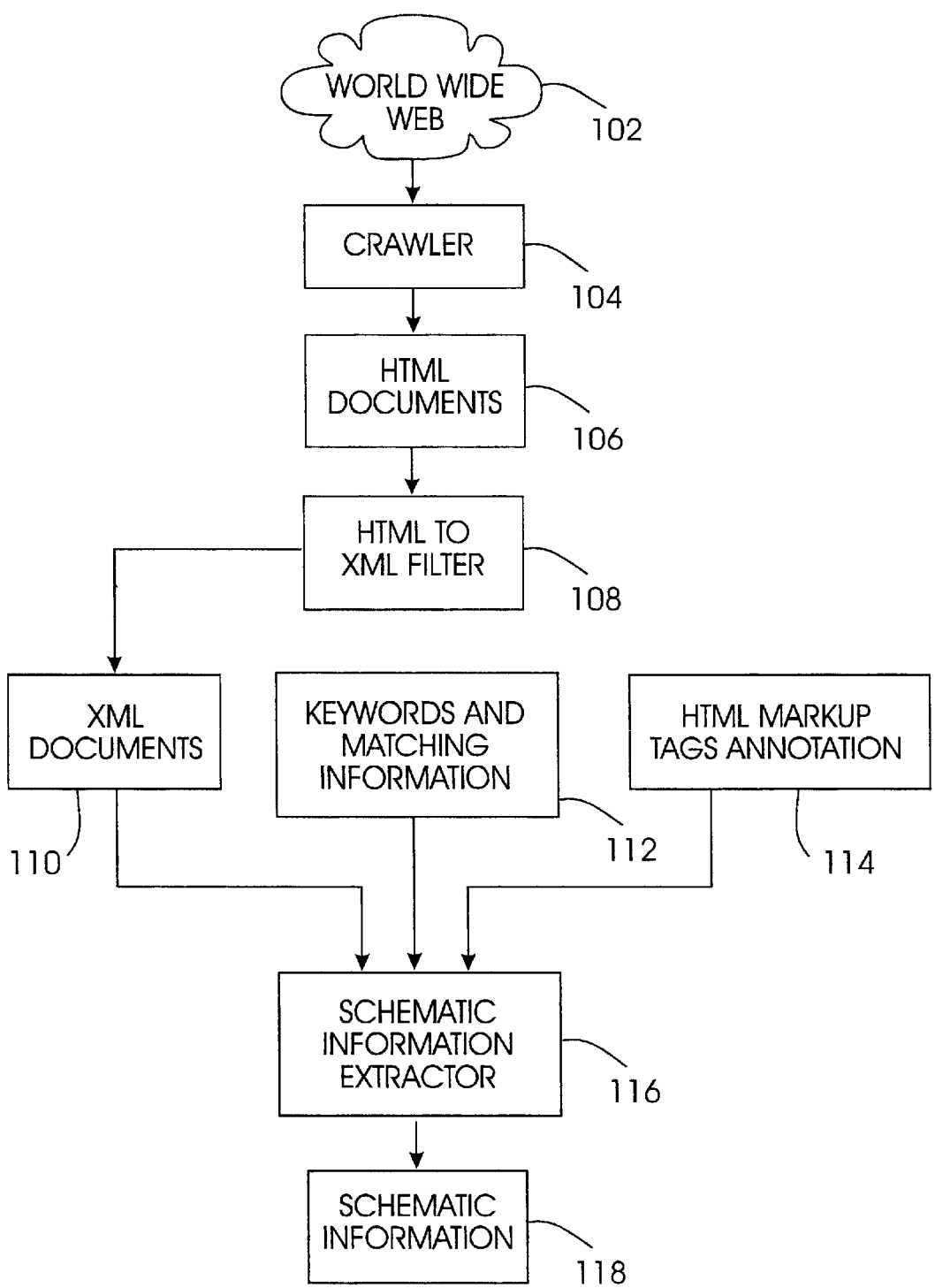
FIG. 1 illustrates an overview of an example web-based environment for the present invention.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

FIG. 1 illustrates an overview of the flow of the present invention, in an example environment of a web-based search engine. This example of the present invention works in the following manner.

A web crawler 104 traverses the web 102 and retrieves a number of HTML documents 106. These HTML documents 108 are converted, using known methods, to XML documents 110 by HTML-to-XML filter 108. This filter converts the HTML document to "well-formed" XML documents, as defined by present and future versions of the XML specification. Also, representations of domain knowledge such as keywords and matching information 112 as well as HTML tag knowledge 114 are constructed by the users of the present system.

Figure 2:
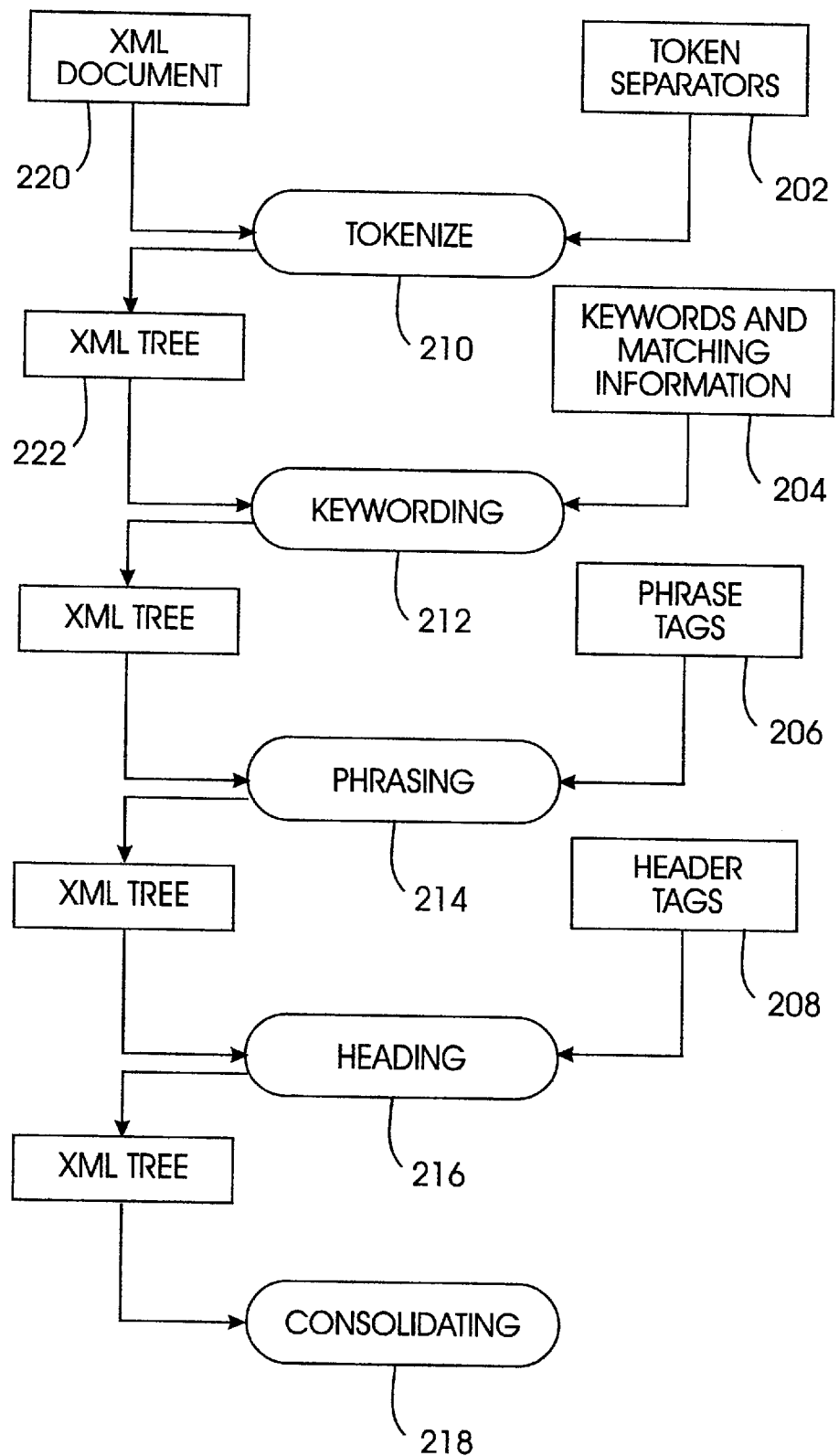
FIG. 2 illustrates an overview of a five step schema extraction process according to the present invention.

HTML tag annotations 114, keyword knowledge 112, and XML documents 110 are provided to extractor 116 which extracts schematic information 118 from XML documents 110. The schematic information extractor 116 uses a five step process to extract schematic information from a set of input documents. FIG. 2 illustrates an overview of schematic information extractor 116 operating on a single XML document.

Knowledge regarding token separators 202, keyword matching information 204, HTML phrase tags 206, and HTML header tags 208 are used appropriately during the five steps of the extraction process: tokenizing 210, keywording 212, phrasing 214, heading 216 and consolidating 218.

The input to and the output from these five steps is depicted on the left hand side of FIG. 2 and include either an XML document 220 or an XML tree 222.

Figure 3:
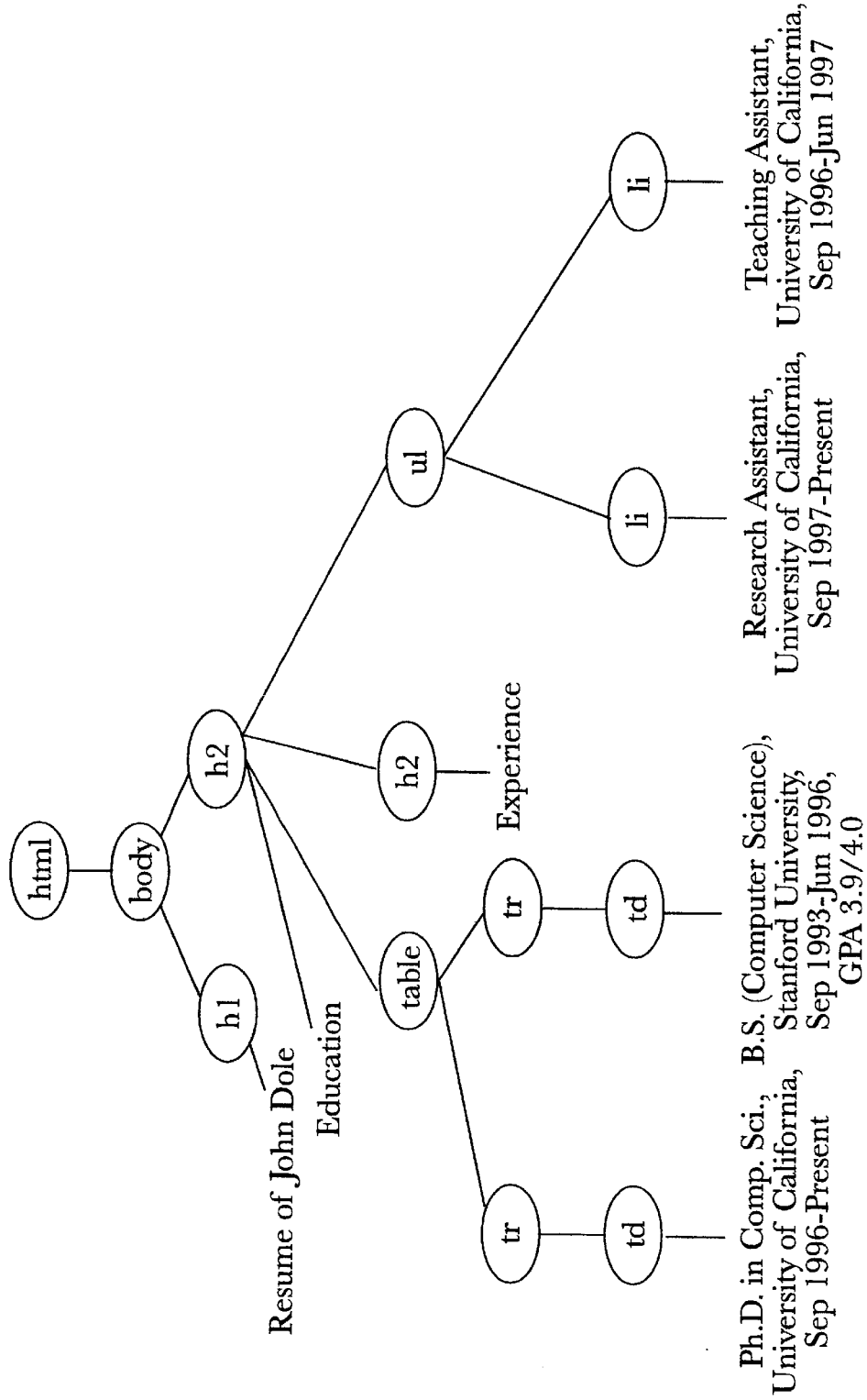
FIG. 3 illustrates an example HTML formatted resume used by the present invention.

Each of the five steps of the schematic extraction process are discussed below in detail. Also, FIG. 3, and FIGS. 4a through 8a depict an example document and how its structure is transformed by each step of the process. FIGS. 4b through 8b depict the HTML and XML code of an example document as it is transformed by each step of the process. The example document, illustrated in FIG. 3, is as follows. Note that the node h2 is incorrectly marked up to denote the incorrect tag usage found in many web documents.

```
<html><body>
  <h1>Resume of John Dole</h1>
  <h2>Education
  <table><tr><td>
    Ph.D. in Comp. Sci., University of California,
    Sept 1996–Present
  </td></tr>
  <tr><td>
    B.S. (Computer Science), Stanford University,
    Sept 1993–Jun 1996, GPA 3.9/4.0
  </td></tr></table>
<h2>Experience</h2>
  <ul><li>
    Research Assistant, University of California,
    Sept 1997–Present </li>
  <li>
    Teaching Assistant, University of California,
    Sept 1996–Jun 1997
  </li></ul></h2></body></html>
```

Hypertext documents, as exemplified above, generally follow an ordered tree model. In formal notation, an ordered tree with root root and immediate children $c_1, \ldots, c_n$, is represented as $$T(root) \equiv <root, <ST(c_1), \ldots, ST(c_n)>>$$

where $$ST(c_i) \equiv \begin{cases} T(c_i) & \text{if } c_i \text{ is an internal node} \\ c_i & \text{if } c_i \text{ is a leaf node} \end{cases}$$

and an empty tree or node is denoted by $\perp$.

This formal notation will be relied upon in describing some of the activities of each of the five steps of the schematic information extraction process. In addition to this formal definition, there are also tree functions which represent manipulations that are routinely performed on tree structures. Some of the ones that are used by the present invention include:

Function Label: transforms a node into a string by computing the label of the markup tag of a node.

Function Value: transforms a node into a string by computing the string value of a node if it is a text node. Otherwise it is $\perp$.

Function Root: computes the root of the tree to which a node belongs.

Function Parent: computes the parent of a node.

Function PrevSibling: computes the previous sibling of a node, or $\perp$ if the node is the first child of its parent.

Function Children: computes the sequence of immediate child nodes of a node.

Function Descendants: computes the set of descendant nodes of a node at all levels.

Function Replace: replaces a subtree of a tree by another, Specifically, Replace(T(node), c, c') returns the tree the same as T(node) but with the subtree rooted at c, T(c) replaced by the subtree rooted at c', T(c'). If T(c')=$\perp$, subtree T(c) is deleted. Typically, the shorthand Replace(T(node), $<c_1, \ldots, c_n>, <c'_1, \ldots, c'_n>$) is used to denote that Replace function is applied consecutively to the tree to replace nodes $c_i$ with $c'_i$ in the order specified in the sequence.

Function Delete: deletes a subtree from a tree. Specifically, Delete(T(node), c) deletes the subtree rooted at c from tree T(node). The shorthand Delete(T(node), $\{c_i\}$) is used to denote that the Delete function is applied consecutively, in any order, to the tree to remove the subtrees specified in $\{c_i\}$.

Function Insert: inserts a subtree into a tree. Specifically, Insert(T(node), c, c') inserts the subtree (T(c')) into T(node) as the previous sibling of c. If c=⊥, c' is inserted as the first child of node. If c' ∉ Descendants(Root(node)), Delete(T(Parent(c')), c') is applied before Insert(T(node), c, c').

Function Parent: computes the parent of a node.

Function PrevParent: computes the previous parent for a node. PrevParent(node) is Parent(node) if no tree reordering function has been applied to T(node). If Replace is applied, PrevParent(node) is the replaced node; in the case of Insert, it is ⊥.

Tokenize Function

In the step of tokenization, a set of punctuation is used to extract structural information from each block of text in the XML document 220. The tokenize function gets a set of punctuation marks (e.g. {";",",", ":"}) and uses them to separate out each block of text into smaller blocks of text. This separating results in unrelated phrases being placed in separate subblocks of text.

The above list of punctuation marks is one group of marks that handles most general HTML documents expected to be encountered by an information gatherer for a search engine. If a particular domain of documents has particular punctuation marks that are specific to that domain, then the set of applicable marks is modified to include these specific marks.

A high level object or concept is often described by several objects which are separated by punctuation. For example, in a resume document, if a topic sentence about the educational background is "University of California at Davis, B.Sci. (Computer Science), Awarded June 1996, GPA 3.8/4.0." The four pieces of information are:

Organization: University of California at Davis

Degree: B.Sci. (Computer Science)

Date: Awarded June 1996

GPA: GPA 3.8/4.0 and all are separated by the punctuation ",". Hence, this heuristic states that a sentence be divided into tokens according to the punctuation. These tokens are then grouped together under a new node labeled item to preserve the fact that the corresponding objects describe the same concept or object of a higher level of abstraction.

A formal definition of this tokenizing function, $\Theta$(T (node)), is:

Let T(node)≡<node, <T($t_1$), ..., T($t_n$)>>, let TS be a set of punctuation, and let node be tokenized into tokens $x=\{x_1, \ldots, x_j\}$.

$$\Theta(T(node)) \equiv \begin{cases} <\text{item}, <x_1, \ldots, x_j>> \\ \text{If node is a text node and } x \neq 0 \\ <\text{node}> \\ \text{If node is a text node and } x = 0 \\ <\text{node}, <\Theta(T(t_1), \ldots, \Theta(T(t_n))>> \\ \text{Otherwise} \end{cases}$$

Function $\Theta$ states that if a node is a text node, it is tokenized into text nodes $x_1, \ldots, x_j$ according to TS. The text nodes are grouped under a new node labeled item. If the node is not a text node, function $\Theta$ is recursively applied to its child nodes.

Figure 4A:
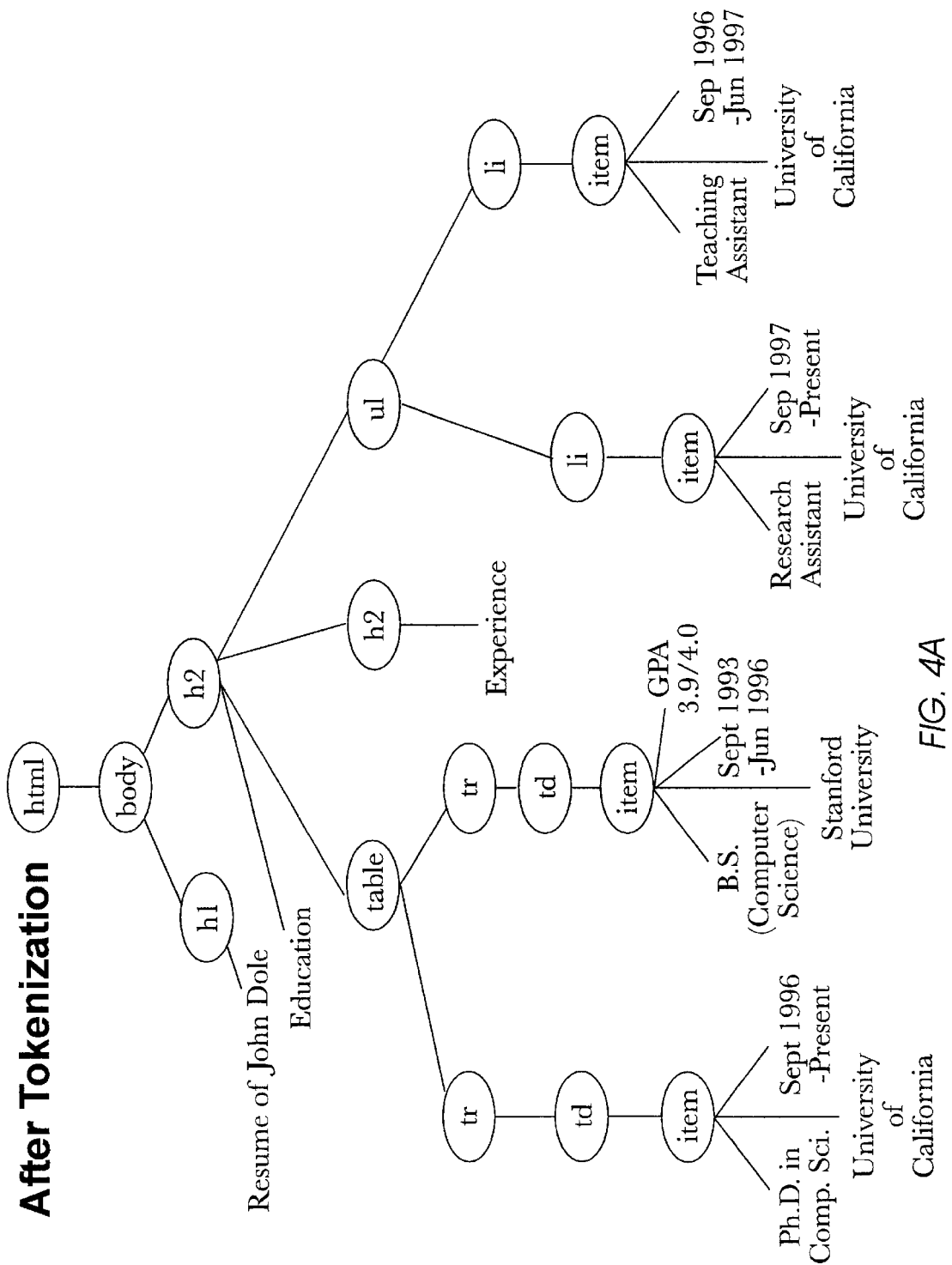
FIG. 4a illustrates the structural effect of the tokenization function of the present invention on an example XML document.

FIGS. 4a and 4b illustrate how this function transforms the example document from FIG. 3.

Keywording Function

This function starts with a set of keywords, their synonyms and certain rules for identifying these keywords from blocks of HTML text and markup. The end result is that these keywords are enhanced to create XML elements with these keywords as element names.

Keywords, as used in the present invention, describe important concepts. Formally, let KI={<$k_i$, $\{s_{i,j}\}$, whole$_i$, case$_i$>} be the domain knowledge about keywords. It consists of a set of keywords K={$k_i$} and associated with keyword $k_i$ is a set of synonyms $\{s_{i,j}\}$. Keyword $k_i$ is identified from a string by matching its synonyms against words in a string; and words are sequences of characters separated by the space character. If case$_i$ is true, pattern matching is case sensitive; otherwise, it is case insensitive. If whole$_i$ is true, then a string must match exactly in order to identify $k_i$; otherwise only a portion of the string has to match in order to identify $k_i$.

Since tokenization partially identifies the component objects describing a higher level object, applying keyword identification after tokenization typically improves the accuracy of identifying the information the keywords describe. For example, the text "University of California, State University of Fresno" is described by two objects—the names of two universities. Assuming there is a keyword Organization with associated synonym "university", application of keywording before tokenization results in two Organization keywords being identified. However, which Organization the keyword "State" belongs to is ambiguous without using sophisticated parsing mechanisms. No such complex and sophisticated parsing is needed when keyword identification is applied after tokenization.

A formal definition of this keywording function $\Gamma$(T (node), is:

Let KI={<$k_i$, $\{s_{i,j}\}$, whole$_i$, case$_i$>} define a set of keywords K={$k_i$} and their information. Keyword function, $\Gamma$(T (node), creates keyword nodes for any keywords identified. A node node is termed as a keyword node if Label(node) ∈ K. It is a non-keyword node otherwise. The switches whole$_i$ and case$_i$ are boolean operators which control how a keyword (and its synonyms) are matched as described above.

Using a function IK(s), which identifies the set of keywords in a string s; let IK(Value($t_i$))={$k_{i,1}, \ldots, k_{i,n}$}.

$\Gamma$(T(node)≡<node, <T'($t_1$), ..., T'($t_n$)>>where $$T'(t_i) \equiv \begin{cases} <\text{item}, <k_{i,1}, \ldots, k_{i,n}>> \\ \text{if } t_i \text{ is a text node and Label(node)} \neq \text{item} \\ <k_{i,1}, \ldots, k_{i,n,i}>> \\ \text{if } t_i \text{ is a text node and Label(node)} = \text{item} \\ \Gamma(T(t_i)) \\ \text{Otherwise} \end{cases}$$

Function Γ states that if the child node $t_i$ of node is a text node with keywords $k_{i,1}, \ldots, k_{i,n,i}$ identified, a node labeled with the same keyword is created. These keyword nodes are grouped under a node labeled item. Node item is created if it does not exist. If node item exists (because of tokenization), keyword nodes are grouped under the same item node since all of them descend from the same node. If $t_i$ is not a text node, function Γ is recursively applied to its subtree.

Figure 5A:
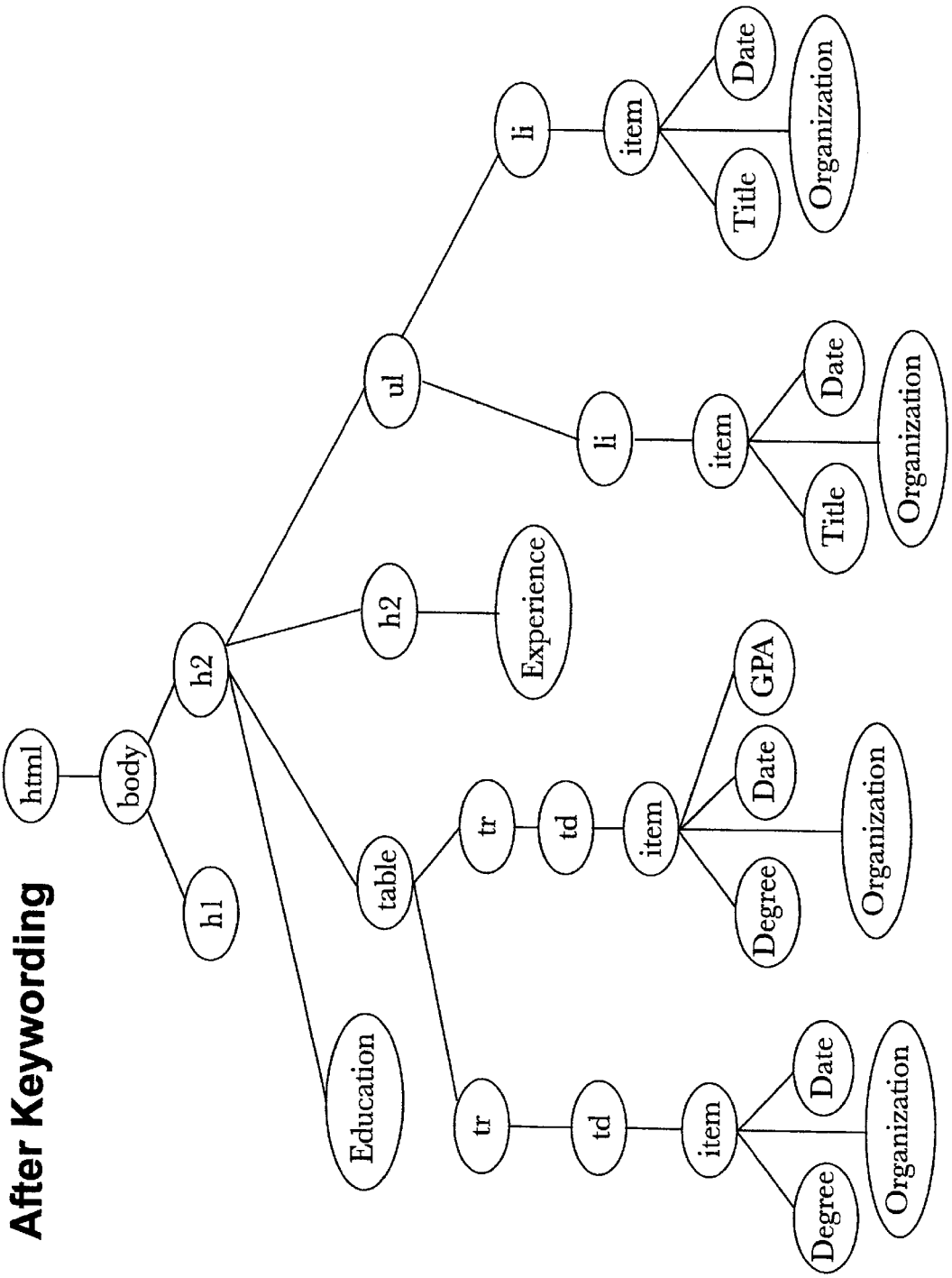
FIG. 5a illustrates the structural effect of the keywording function of the present invention on an example XML tree.

FIGS. 5a and 5b show the effect of the keywording function on the tokenized tree from FIGS. 4a and 4b. In this example, K={Education, Experience, Degree, GPA, Organization, Date, Title}.

Phrasing Function

In this step, certain HTML tags, which are often used to break a document into sections, are identified and used to restructure the document.

The system identifies tags such as p, hr, h1, h2, etc. as phrase tags. This list of tags is just an example list and various additions and deletions of other HTML tags are also contemplated within the scope of the present invention.

The set of mark-up tags M, termed "phrase tags", give hints to the grouping of semantically related nodes in a hypertext document. Block elements (e.g. p, hr), list elements (e.g. dl, ul), heading elements (e.g. h1, h4), and table elements (e.g. tr, td) are often used to divide data into paragraphs or sections. Phrase tags are used to aggregate semantically related nodes by grouping everything between two consecutive nodes, labeled with the same phrase tag, into one new node labeled group.

A formal definition of the phrasing function, $\phi(T(node))$, is:
Let $P \subseteq M$ be a set of phrase tags.
Define $$p_1 \equiv \begin{cases} t_k & \text{if } \exists\, t_k \text{ such that Label}(t_k) \in P \text{ and} \\ & (\nexists\, t_j \text{ such that } t_j \in P \text{ and } j < k) \\ \bot & \text{otherwise} \end{cases}$$

$p \equiv \{p_1, \ldots, p_m | \text{Label}(p_k) = \text{Label}(p_1), p_k \in \text{Children(node)}\}$
where $p_1$ is the first child node of node labeled with a phrase tag and p is the set of child nodes of node with the same label as $p_1$.
Define function MakeChild:

$$\text{MakeChild}(t_i, t_j) \equiv \begin{cases} <t_i, <\text{group}, <T(c_1), \ldots, T(c_p)>>, \\ \quad T(t_{i+1}), \ldots, T(t_{j-1})> & \text{if } i < j \\ T(t_i) & \text{if } i = j \\ \bot & \text{otherwise} \end{cases}$$

Function MakeChild makes the subtrees rooted from $t_{i+1}, \ldots, t_{j-1}$ child nodes of $t_i$. The original children nodes of $t_i$, $c_1, \ldots, c_p$, are grouped under a new node with the tag group.
Define phrasing function, $\phi$:

$$\varphi(T(node)) \equiv \begin{cases} <\text{node}, <t_1, \ldots, \text{PrevSibling}(p_1), \\ \quad \varphi(T'(p_1)), \ldots, \varphi(T'(p_m))>> \\ \text{if} \quad p \neq 0 \\ T(\text{node}) \quad \text{otherwise} \end{cases}$$

where $$T'(p_i) \equiv \begin{cases} \text{MakeChild}(p_i, p_{i+1}) & \text{if } 1 \leq i \leq m-1 \\ \text{MakeChild}(p_i, t_n) & \text{if } i = m \end{cases}$$

Function $\phi$ states that if node has child nodes labeled with a phrase tag, for such a node $p_i$, nodes from its next sibling until the next node with the same label (or the last sibling if there is none) become its child nodes. Function $\phi$ is recursively applied to the subtree rooted at $p_i$, and nodes before $p_1$ remain the same.

Figure 6A:
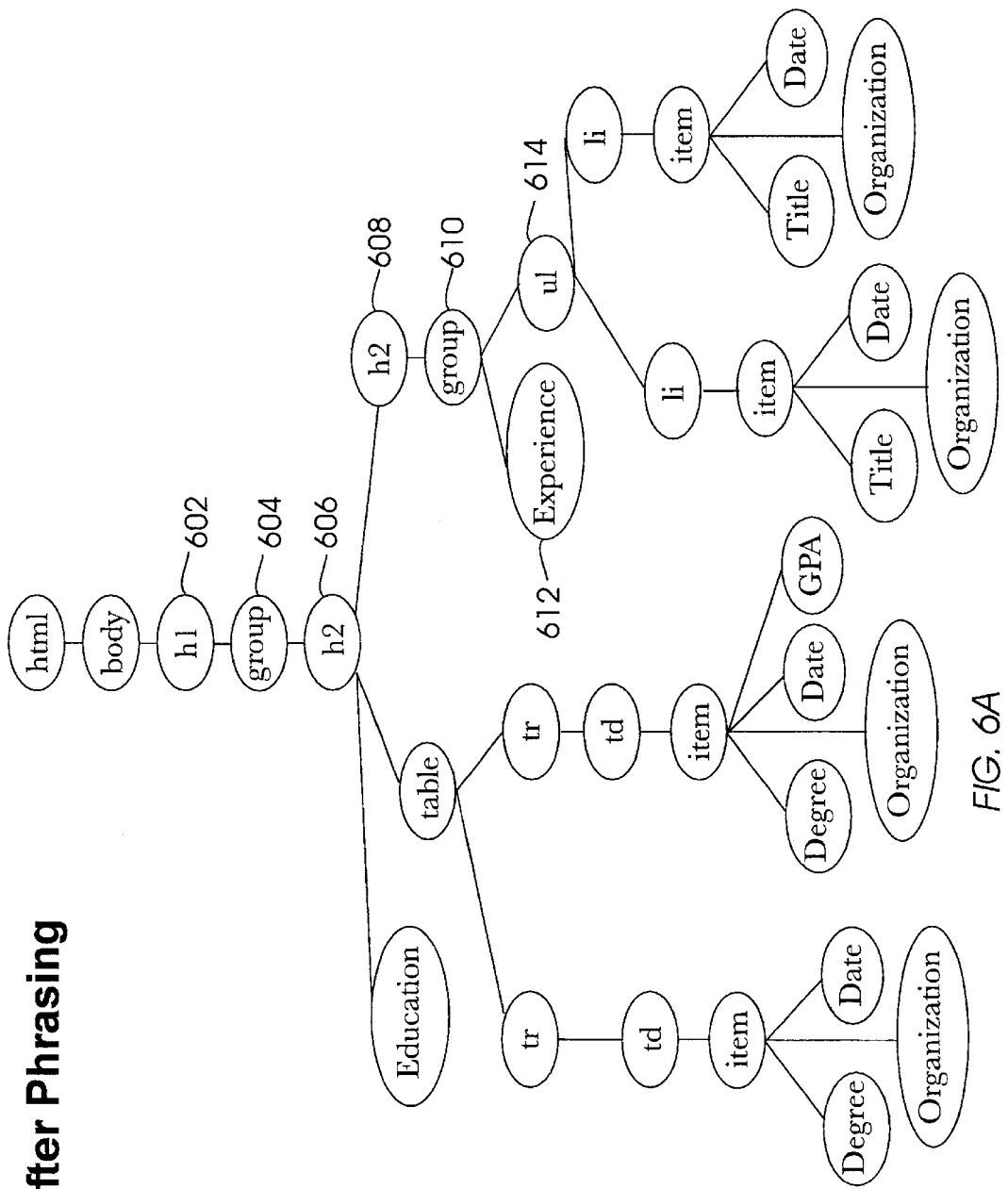
FIG. 6a illustrates the structural effect of the phrasing function of the present invention on an example XML tree.

FIGS. 6a and 6b illustrate the operation of function $\phi$ on the example document with P={h1, h2}. The result, shown in FIG. 6a, is that h2 606 and all its children nodes descend from newly created group node 604 which, itself is a child node of h1 602. Also, group node 610 is created under h2 608 and nodes 612 and 614 and their children are moved under group node 610.

Heading Function

This function reformats any header tags that are nested under identical header tags. Header tags are typically used to structurally divide HTML documents into separate sections. By requiring that no two-header tags of the same label can be on the same path from the root of the document, this heuristic modifies every such occurrence such that the two occurrences become siblings of each other.

These header tags divide data of a document into sections of the same level of abstraction regardless of their markup style. Hence, this heuristic states that objects under nested header tags of the same label are re-ordered to be siblings of each other.

A formal definition of this heading function, $\Psi(T(node))$, is:
Let $H \subseteq M$ be a set of header tags. Heading function $\Psi$ reorders the tree so that there are no two nodes with the same header tags along the same path from the root.
Given a node $t_i$ with Label$(t_i) \in H$, define $$\begin{aligned} h &= \{t_{i,1}, \ldots, t_{i,h,i}\} \\ &= \{t_h | t_h \in \text{Descendants } (T(t_i)) \text{ and} \\ &\quad \text{Label}(t_h) = \text{Label}(t_i) \in H \text{ and} \\ &\quad (\nexists\, t_{h'} \in \text{Descendants}(T(t_i)) \text{ such that Label}(t_{h'}) = \text{Label}(t_i) \\ &\quad \text{and} \\ &\quad t_h \in \text{Descendants}(T(t_{h'}))) \} \end{aligned}$$

where $\{t_{i,1}, \ldots, t_{i,h,i}\}$ is the set of child nodes of $t_i$, labeled with the same header tag which do not have an ancestor labeled with the same header tag except $t_i$ itself, in the subtree $T(t_i)$.

$$\Psi(T(node)) = <\text{node}, <T(t_1), \Psi(T(t_{1,1})), \ldots, \Psi(T(t_{1,h,1})), \ldots, T(t_n), \Psi(T(t_{n,1})), \ldots, \Psi(T(t_{n,h,n}))>>$$

where $$T'(t_i) \equiv \begin{cases} \Psi(T(t_i)) \\ \text{If } t_i \notin H \text{ and } t_i \text{ is an internal node} \\ T(t_i) \\ \text{If } t_i \notin H \text{ and } t_i \text{ is a leaf node} \\ \Psi(\text{Delete}(T(t_i), \{t_{i,1}, \ldots, t_{i,h,i}\})) \\ \text{If } t_i \in H \end{cases}$$

Function $\Psi$ states that if a child node $t_i$ is not labeled with a header tag, function $\Psi$ is recursively applied to its subtree.

Otherwise, all subtrees under root $t_i$ rooted with the same header tag $T(t_{i,1}), \ldots, T(t_{i,h,i})$ become siblings of $t_i$. Function $\Psi$ is applied recursively to all these subtrees.

Figure 7A:
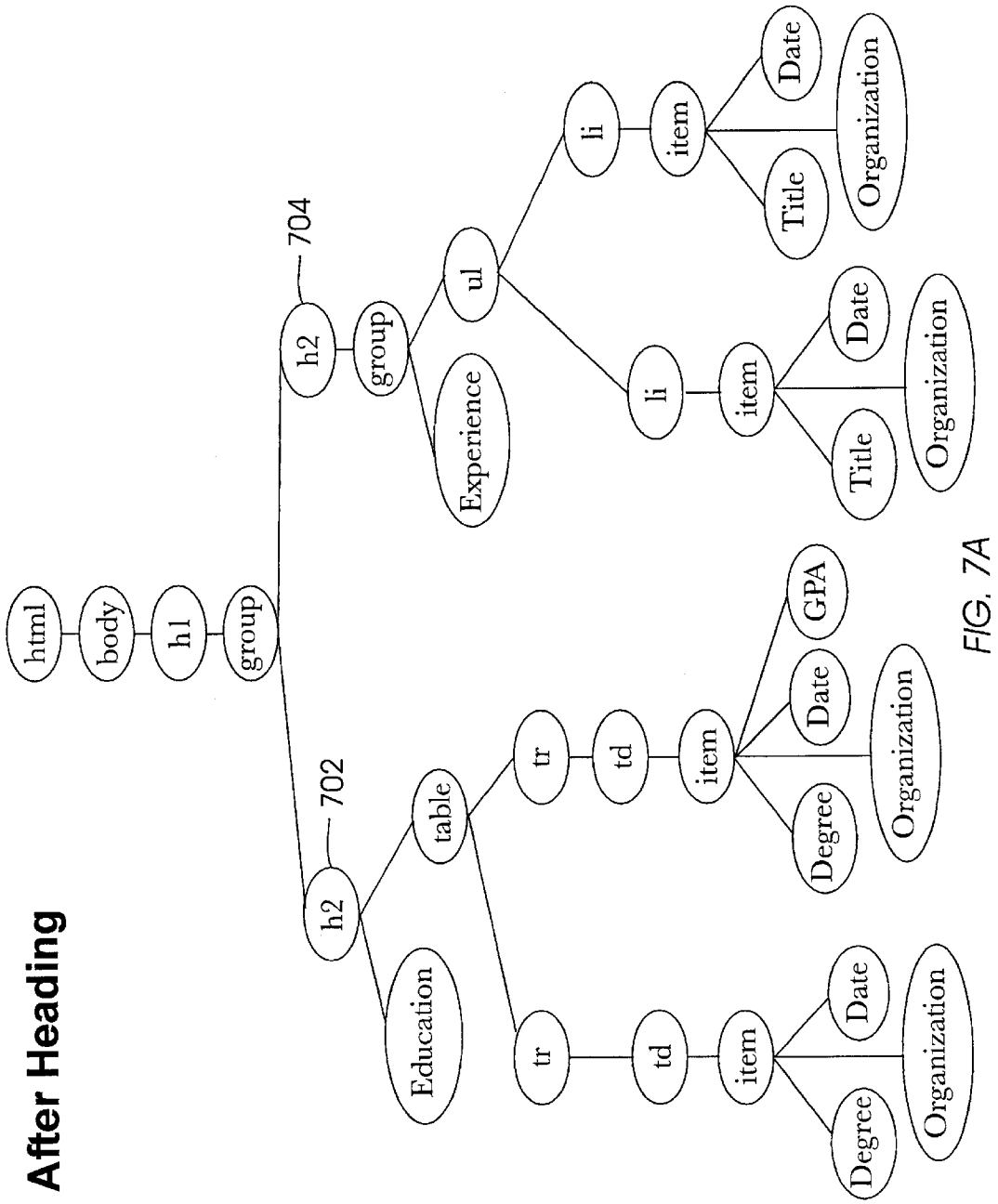
FIG. 7a illustrates the structural effect of the heading function of the present invention on an example XML tree.

The result of applying the heading function to the example document is illustrated in FIGS. 7a and 7b. As an example, H={h2}, and as a result, in FIG. 7a, the h2 nodes 702 and 704 become siblings.

Consolidation Function

For a document being analyzed by the present invention, the non-keyword nodes do not necessarily provide critical schematical information regarding the document; however, the structure of the keyword nodes are of prime importance. The consolidation function replaces non-keyword nodes with keyword nodes and this heuristic is driven by the following observations.

First, very often, the first object of a group of semantically related objects describes the topic of this group of objects. This is analogous to the topic sentence of a paragraph. The heuristic, therefore, replaces a non-keyword node by its first keyword child., Second, an object or concept is often described by a set of objects sharing similar schema and these objects frequently start with the same keyword. Third, if the parent node is a tag known to exhibit list structure (e.g. ul, dl, table), its child nodes are very likely to be objects at the same level of abstraction. Hence, if a sibling of the chosen keyword node is labeled with the same keyword, or their parents have the same tag label, or their parent is a list structure, sibling relationship with the chosen keyword is maintained.

For example, given the following hypertext document:

```
<ul>
   <Degree/>
   <University/>
   <Thesis/>
   <Degree/>
   <University/>
</ul>
``` with its corresponding schematic structure:

```
<ul>
   <Degree/>
      <University/>
      <Thesis/>
   <Degree/>
      <University/>
</ul>
``` the schematic structure is identified based on the following:

1) <ul> is a tag known to exhibit list structure, so it is likely that it contains a set of child nodes of similar schematic structure;

2) node Degree describes the topic of the nodes under <ul> because it is the first keyword child node of <ul>, and 3) two of the child nodes of <ul> are labeled with the same keyword Degree, and these nodes are likely to be "topic sentences" for other nodes.

Also, if the previous parents (i.e. the non-keyword nodes replaced) of two sibling nodes have the same tag label, it is likely that they are marked-up in the same way and hence, share similar schematic structure. Sibling relationship is thus maintained for these nodes. For example, using this heuristic, the HTML fragment:

```
<ul>
   <li>
      <Job/>
      <Organization/>
      <Date/>
   </li>
   <li>
      <Title/>
      <Organization/>
      <Date/>
   </li>
</ul>
``` becomes

```
<ul>
   <Job>
      <Organization/>
      <Date/>
   </Job>
   <Title>
      <Organization/>
      <Date/>
   </Title>
</ul>
```

The two <li> nodes are replaced by Job and Title respectively. These consecutive sibling keyword nodes have the same previous parent <li>, which hints that they contain information sharing similar schematic structure.

A formal definition of this consolidation function, $\Delta(T(node))$, is:

Let $L \subseteq M$ be a set of list tags whose child nodes contain information at the same level. Define function beSibling:

$$\text{beSibling}(k_i, k_j) \equiv \begin{cases} \text{True} & \text{if } \text{Label}(k_i) = \text{Label}(k_j) \text{ or} \\ & \text{Label}(\text{PrevParent}(k_i)) = \\ & \text{Label}(\text{PrevParent}(k_j)) \neq \perp \text{ or} \\ & \text{Parent}(k_i) \in L \\ \text{False} & \text{otherwise} \end{cases}$$

Function beSibling states that if node $k_i$, $k_j$ have the same label, or their previous parents have the same label, or their parent is labeled with a list tag, then the two nodes maintain their sibling relationship.

Let $k \equiv \{k_1, \ldots, k_p | \text{Label}(k_i) \in K, k_i \in \text{Children}(node), k_i < k_{i+1}, \text{beSibling}(k_1, k_i) = \text{true}\}$ where k is the set of child nodes of node which need to maintain sibling relationship.

$$(T(node)) \equiv \begin{cases} T(node) \\ \text{If Label}(node) \in K \\ \Delta(\text{Replace}(T(\text{Parent}(node)), node, <T'(k_1), \ldots, T'(k_p)>) \\ \text{If Label}(node) \notin K \text{ and Parent(Parent}(node)) \neq \perp \\ \text{Replace}(T(\text{Parent}(node)), node, <T'(k_1), \ldots, T'(k_p)>) \\ \text{Otherwise} \end{cases}$$

where $$T'(k_i) \equiv \begin{cases} \text{MakeChild}(k_i, k_{i+1}) & \text{if } i < p \\ T(k_i) & \text{if } i = p \end{cases}$$

Function Δ states that a non-keyword node is replaced by its first keyword child node, $k_1$, and the other child nodes $k_1, \ldots, k_p$ whose sibling relationship with $k_1$ must also be maintained. Nodes between $k_i, k_{i+1}$, become child nodes of $k_i$ in the new subtree $T(k_i)$. Function Δ is recursively applied to the new tree until a root which is not replaced by any keyword node is reached.

Figure 8A:
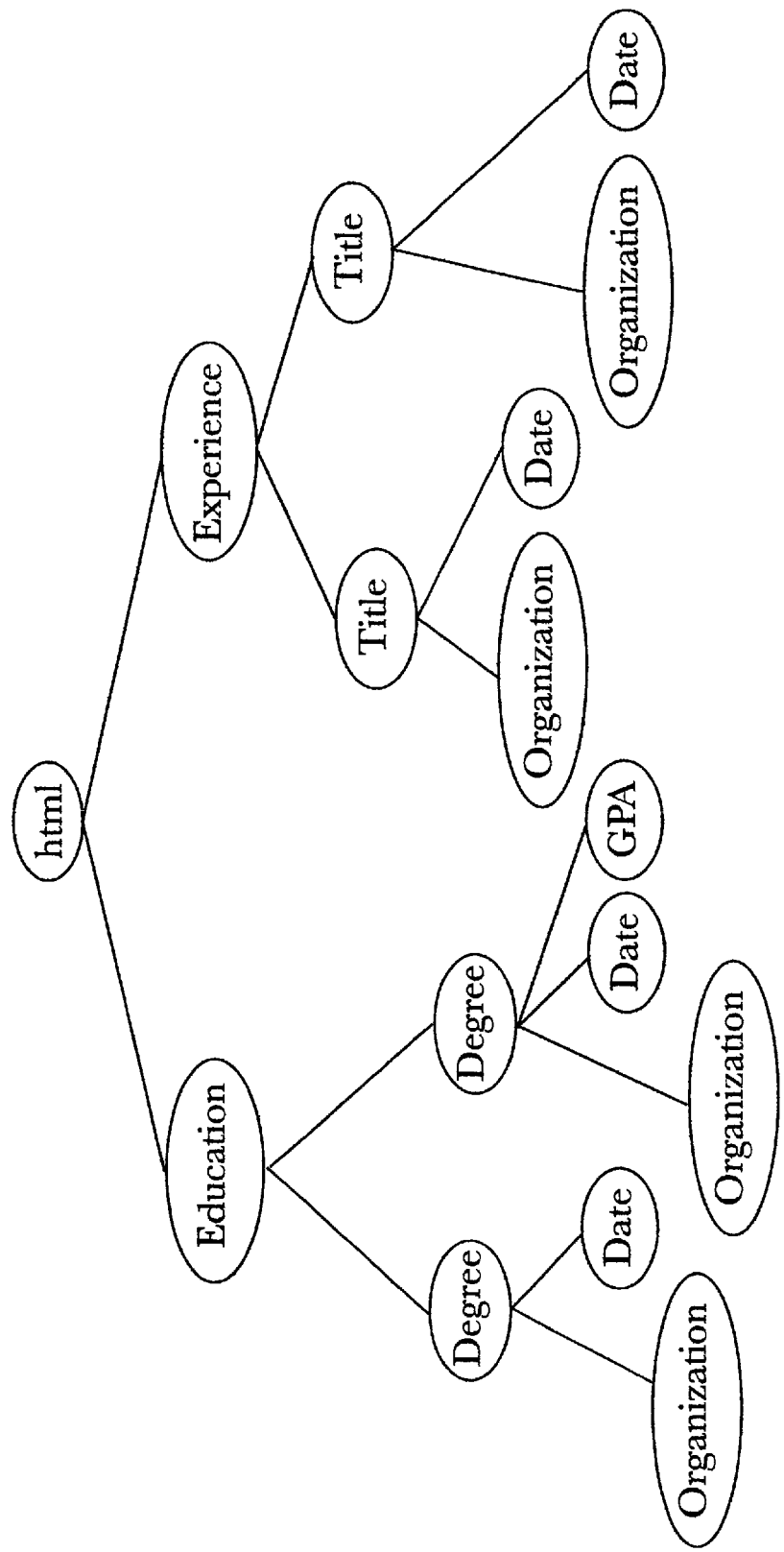
FIG. 8a illustrates an extracted schema from an example XML tree resulting from applying the consolidation function of the present invention.

FIGS. 8a and 8b show the final form of the example document after applying the consolidation function with L={ul}. The discovered schematic form of this document, as depicted in FIG. 8b, is now:

```
<html>
<Education> Education
    <Degree> Ph.D. in Comp. Sci.
        <Organization> University of California </Organization>
        <Date> Sept 1996-Present </Date>
    </Degree>
    <Degree> B.S.(Computer Science)
        <Organization> Stanford University </Organization>
        <Date> Sep 1993-Jun 1996 </Date>
        <GPA> GPA 3.9/4.0 </GPA>
    </Degree>
</Education>
<Experience> Experience
    <Title> Research Assistant
        <Organization> University of California </Organization>
        <Date> Sep 1997-Present </Date>
    </Title>
    <Title> Teaching Assistant
        <Organization> University of California </Organization>
        <Date> Sep 1996-Jun 1997 </Date>
    </Title>
</Experience>
</html>
```

One useful application of the schematic structure discovered is to support structural queries in search engines. These search engines are able to use the schematic structure of keywords to locate data that are more semantically related to the information users are searching for. For example, using simple keyword searching, a job recruiter looking for candidates who hold a masters degree from University of California may uncover candidates who have simply lived in California and received a masters degree elsewhere.

However, using the discovered schematic structure
    <University>
      <Degree/>
      <Date/>
    </University>
the recruiter is now able to locate only those candidates holding masters degrees from University of California by specifying a match of both the degree and university.

Very often a set of related hypertext documents share similar schematic structure but their common schema is not explicitly specified. The schematic structure, once discovered using the present invention, from this set of related hypertext documents will serve as the input to discover this common schema. For example, a common schema for a set of hypertext documents similar to the example document, expressed as an XML DTD, would be:
<!ELEMENT html (Education, Experience)>
<!ELEMENT Education (Degree, (Organization, Date, GPA*))>
<!ELEMENT Experience (Title, Organization, Date))>
<!ELEMENT Degree #PCDATA>
<!ELEMENT Organization #PCDATA>
<!ELEMENT Date #PCDATA>
<!ELEMENT GPA #PCDATA>
<!ELEMENT Title #PCDATA>

CONCLUSION

A system and method have been shown in the above embodiment for the effective implementation of identifying keywords and their schematic structure from hypertext documents using heuristics guided by domain knowledge. While various embodiments have been shown and described, it will be understood that there is no intent to limit the invention by such disclosure, but rather, it is intended to cover all modifications and alternate constructions falling within the spirit and scope of the invention as defined in the appended claims. For example, the present invention should not be limited by computer operating system, computer hardware platform, specific document source language, or specific document target language, In addition, the present invention can be implemented locally on a single PC, connected workstations (i.e. networked-LAN), across extended networks such as the Internet or using portable equipment such as laptop computers or wireless equipment (RF, microwaves, infrared, photonics, etc.).

APPENDIX A

Computational Complexity

Below we give an analysis on the computational complexity of the structuring functions. We show that each structuring function is applied to the nodes in the tree at most once, which implies that the running time of our heuristics is linear to the size of the tree. We also prove that applying each heuristic more than once does not change the tree structure. Hence, we only need to apply the heuristics once to attain stability.

Theorem 1 (One Pass Property) In computing F(T(node)), $F \in \{\Theta, \Gamma, \Phi, \Psi, \Delta\}$, F is recursively applied to each node in T(node) at most once.

Proof

F is only recursively applied to the child nodes of node satisfying the conditions defined by F. Since a node cannot be a child of itself, once the function is applied, it is never applied to it again.

Theorem 2 (One Time Property) F(F(T(node)))=F(T (node)), $F \in \{\Theta, \Gamma, \Phi, \Psi, \Delta\}$. Hence, we only need to apply each structuring function to the tree once. Applying each function more than once does not change the tree structure.

Proof

Case I: F=Θ

Θ changes the tree structure of text nodes only. Once a text node is tokenized into tokens, the tokens cannot be further tokenized. Hence, when applying Θ to Θ(T(node))), Θ is not recursively applied to node. The tree structure of the node remains unchanged thereafter.

Case II: F=Γ

This is similar to Case I.

Case III: F=Φ

In Φ(T(node)), a child $p_i$ of node is either labeled with a phrase tag or its next sibling is labeled with the same phrase tag. Hence, in computing Φ(Φ(T(node))), $T^1(p_i)=T(p_i)$. The tree structure of T(node) is unchanged.

Case IV: F=Ψ

This is similar to Case III.

Case V: F=Δ

Δ reorders the tree by replacing all non keyword nodes (except the root) by keyword nodes. Hence in Δ(T(node) all nodes except the root are keyword nodes. Applying Δ to Δ(T(node) does not have any effect on the tree.

Empirical Results

Experiment Environment

We implement the heuristics by combining them into two passes, one top down tree traversal for tokenization, keywording, phrasing and heading, one bottom up tree traversal for consolidation.

Domain knowledge specifies the following annotation of hypertext markup tags:

TS={';',':',',',}
P={h1, h2, h3, h4, h5, h6, h4, div, p, tr, dt, dd, li, title, u, strong, b, em, i}
H={h1, h2, h3, h4, h5, h6, hr, div, center}
L={body, table, dl, ul, ol, dir, menu}

There are 24 keywords and a total of 233 synonyms specified in domain knowledge.

The data is obtained from a collection of resumes available as HTML in the web. A web crawler was used to quickly obtain these resumes. The original hypertext documents are first converted to well formed XML documents before their schematic structure is extracted. Hypertext markup tags not considered in the domain knowledge, such as font, a, meta, dir, are ignored.

We ran our experiment on a Pentium 266 MHz processor with 196 MB main memory and 512 B cache.

Efficiency

We ran the algorithm on 100 hypertext documents to evaluate the average running time of one hypertext document. The average number of nodes of a hypertext document in the dataset is 203 of which 52 are keyword nodes. The average file size is 11.7 KB. The average running time was found to be 0.53 seconds.

We measure the scalability of our heuristics with respect to the sizes of the hypertext documents, the number of nodes in the hypertext documents and the number of keyword nodes.

The heuristics scaled linearly with the sizes of the documents which estimates the total length of text nodes and the number of nodes in the documents. Tokenize and keywording functions depend on the total length of all text nodes, and all structuring functions depend on the number of keyword nodes. Therefore, the experimental results confirm the One Pass Property.

Also, the running time does not bear very strong linear relationship with the number of nodes. This may seem to contradict One Pass Property. However, the running time of tokenize and keywording functions depends on the total length of all the text nodes, not just the number of nodes. Running time of other functions like phrasing, heading and consolidation functions depends on the number of keyword nodes, not the number of nodes in the hypertext documents. Hence, we expect the running time to scale linearly with the number of keyword nodes instead, which was indeed observed.

In sum, the heuristics scales linearly with the document sizes and the number of keyword nodes.

What is claimed is:

1. A method of reformatting at least one mark-up language document comprising the steps:

discovering a schematic structure from said document and creating a reformatted document with a schema corresponding to said schematic structure, said steps of discovering and reformatting comprising:

receiving a document having a plurality of semantic nodes and a plurality of formatting nodes;

tokenizing said plurality of said semantic and formatting nodes;

identifying a set of keyword nodes, said set of keyword nodes comprising at least one of said plurality of semantic nodes which match an element in a set of keywords and corresponding synonyms;

labeling each element of said set of keyword nodes with a label corresponding to a matching keyword;

arranging said plurality of said semantic and formatting nodes so that each node representing an object of a similar level of abstraction are arranged as sibling nodes;

identifying a non-keyword set of nodes, said non-keyword set comprising all of said plurality of semantic and formatting nodes not an element of said set of keyword nodes;

determining for each node in said non-keyword set a corresponding first child node which is also an element of said set of keyword nodes, said corresponding first child node having a keyword label, and reformatting said document by generating a document with a schema having a keyword structure based upon re-labeling each node in said non-keyword set with a keyword label of said corresponding first child node.

2. A method of reformatting at least one mark-up language document, as per claim 1, wherein said at least one mark-up language document is written in HTML.

3. A method of reformatting at least one mark-up language document, as per claim 1, wherein said schema is expressed in XML.

4. A method of reformatting at least one mark-up language document, as per claim 1, wherein said method is implemented locally or remotely on one or more computer-based systems.

5. A method of reformatting at least one mark-up language document, as per claim 1, wherein said method is implemented across networks comprising any of LANs, WANs, cellular, Internet or Web-based networks.

6. A method of extracting a schematic structure from a document represented by an ordered tree having a plurality of labeled nodes comprising the steps:

tokenizing said plurality of labeled nodes, wherein each of a first plurality of text nodes in said tree are separated into a plurality of tokens grouped under a specified label;

identifying a second plurality of text nodes which each reference an associated keyword;

labeling each of said second plurality of text nodes with a label corresponding to said associated keyword;

creating a plurality of groups of nodes, each group comprising those nodes of said second plurality of text nodes which have a same immediate parent node;

recursively applying, to said plurality of labeled nodes of said ordered tree, a heuristic comprising the following steps:

identifying each of said plurality of labeled nodes which have child nodes, $p_i$, labeled with a phrase tag, and for each $p_i$ identified, re-arranging a set of nodes, said re-arranging resulting in said set of nodes becoming child nodes of $p_i$, wherein said set of nodes comprises all nodes from a next sibling of $p_i$ either 1) a next node with a label the same as $p_i$'s label or 2) a last sibling of $p_i$ if said next node does not exist;

identifying a set of nodes, each element of said set having a label corresponding to a header tag;

re-ordering said plurality of labeled nodes so that there are no two nodes with a same label along a same path from a root of said ordered tree;

identifying a non-keyword set of nodes, said non-keyword set comprising all of said plurality of labeled nodes which are not labeled with a keyword;

identifying for each element of said non-keyword set a corresponding fist child node which is labeled with a keyword, replacing each element of said non-keyword set with said corresponding first child node, with the constraint that if at least two nodes 1) have a same label, 2) each have, before performing said step of replacing, a parent node having a same label or 3) a parent having a list tag, then maintaining a sibling relationship between them.

7. A method of extracting a schematic structure from a document represented by an ordered tree having a plurality of labeled nodes, as per claim 6, wherein said keyword comprises a base word and at least one synonym of said base word.

8. A method of extracting a schematic structure from a document represented by an ordered tree having a plurality of labeled nodes, as per claim 6, wherein at least one punctuation mark is used as a delimiter to identify each of said plurality of tokens.

9. A method of extracting a schematic structure from a document represented by an ordered tree having a plurality of labeled nodes, as per claim 8, wherein said at least one punctuation mark is at least one of ",", ":", or ";".

10. A method of extracting a schematic structure from a document represented by an ordered tree having a plurality of labeled nodes, as per claim 6, wherein said document is written in HTML.

11. A method of extracting a schematic structure from a document represented by an ordered tree having a plurality of labeled nodes, as per claim 10, wherein said phrase tag is at least one of h1, h2, h3, h4, h5, h6, div, p, tr, td, dt, dd, li, title, u, strong, b, em, or i.

12. A method of extracting a schematic structure from a document represented by an ordered tree having a plurality of labeled nodes, as per claim 10, wherein said header tag is at least one of h1, h2, h3, h4, h5, h6, hr, div, or center.

13. A method of extracting a schematic structure from a document represented by an ordered tree having a plurality of labeled nodes, as per claim 10, wherein said list tag is at least one of body, table, dl, ul, ol, dir, or menu.

14. A method of extracting a schematic structure from a document represented by an ordered tree having a plurality of labeled nodes, as per claim 6, wherein said method is implemented locally or remotely on one or more computer-based systems.

15. A method of extracting a schematic structure from a document represented by an ordered tree having a plurality of labeled nodes, as per claim 1, wherein said method is implemented across networks comprising any of LANs, WANs, cellular, Internet or Web-based networks.

16. An article of manufacture comprising a computer user medium having a computer readable program code embodied therein which implements reformatting at least one mark-up language document by discovering a schematic structure from said document and creating a reformatted document with a schema corresponding to said schematic structure, said steps of discovering and reformatting comprising:

receiving a document having a plurality of semantic nodes and a plurality of formatting nodes;

tokenizing said plurality of said semantic and formatting nodes;

identifying a set of keyword nodes, said set of keyword nodes comprising at least one of said plurality of semantic nodes which match an element in a set of keywords and corresponding synonyms;

labeling each element of said set of keyword nodes with a label corresponding to a matching keyword;

arranging said plurality of said semantic and formatting nodes so that each node representing an object of a similar level of abstraction are arranged as sibling nodes;

identifying a non-keyword set of nodes, said non-keyword set comprising all of said plurality of semantic and formatting nodes not an element of said set of keyword nodes;

determining for each node in said non-keyword set a corresponding first child node which is also an element of said set of keyword nodes, said corresponding first child node having a keyword label, and reformatting said document by generating a document with keyword structure based upon re-labeling each node in said non-keyword set with a keyword label of said corresponding first child node.

17. A computer-based system for extracting a schematic structure from at least one document represented by an ordered tree having a plurality of labeled nodes comprising:

a first I/O receiver which accepts said at least one document, tokenizes said at least one document to extract structural information, and outputs a document having a plurality of tokens;

a second I/O receiver which accepts a set of keywords and corresponding synonyms, identifies and matches keywords in nodes of said document with said plurality of tokens, and outputs a document having one or more nodes labeled with keywords;

a third I/O receiver which accepts output of said second I/O receiver and a table of mark-up language tags which comprise a plurality of specified groups, groups semantically related nodes in said document output by said second I/O receiver, and outputs a document based upon said grouping;

a heading function which receives and restructures document output from said third I/O receiver, said restructuring allowing objects under nested header tags of a similar label to be reordered as siblings of each other, and a consolidating function which receives output of said heading function and generates a document with keyword structure by replacing a non-keyword node with its first keyword child.

18. A computer-based system for extracting a schematic structure from at least one document represented by an ordered tree having a plurality of labeled nodes, as per claim 17, wherein said at least one document is written in HTML.

19. A computer-based system for extracting a schematic structure from at least one document represented by an ordered tree having a plurality of labeled nodes, as per claim 18, wherein said plurality of specified groups comprise phrase tags, header tags, and list tags.

20. A computer-based system for extracting a schematic structure from at least one document represented by an ordered tree having a plurality of labeled nodes, as per claim 17, wherein said first, second and third I/O receivers are the same.

21. A computer-based system for extracting a schematic structure from at least one document represented by an ordered tree having a plurality of labeled nodes, as per claim 17, wherein said tokenization step uses a set of punctuation rules to separate said plurality of labeled nodes into said plurality of tokens.

22. A computer-based system for extracting a schematic structure from at least one document represented by an ordered tree having a plurality of labeled nodes, as per claim 17, wherein said system is implemented locally or remotely on one or more computer-based systems.

23. A computer-based system for extracting a schematic structure from at least one document represented by an ordered tree having a plurality of labeled nodes, as per claim 17, wherein said system is implemented across networks comprising any of LANs, WANs, cellular, Internet or Web-based networks.

* * * * *